Sept. 27, 1927. 1,643,912
A. A. WEST
SUPPLEMENTARY EXHAUST FOR INTERNAL COMBUSTION ENGINES
Filed May 3, 1923 5 Sheets-Sheet 2
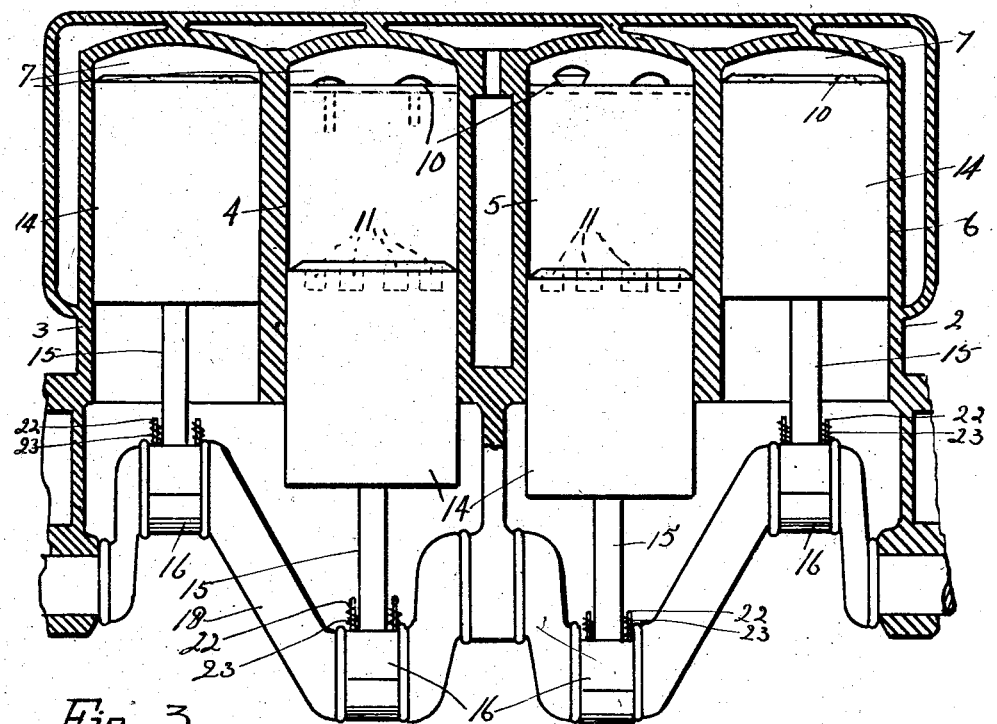
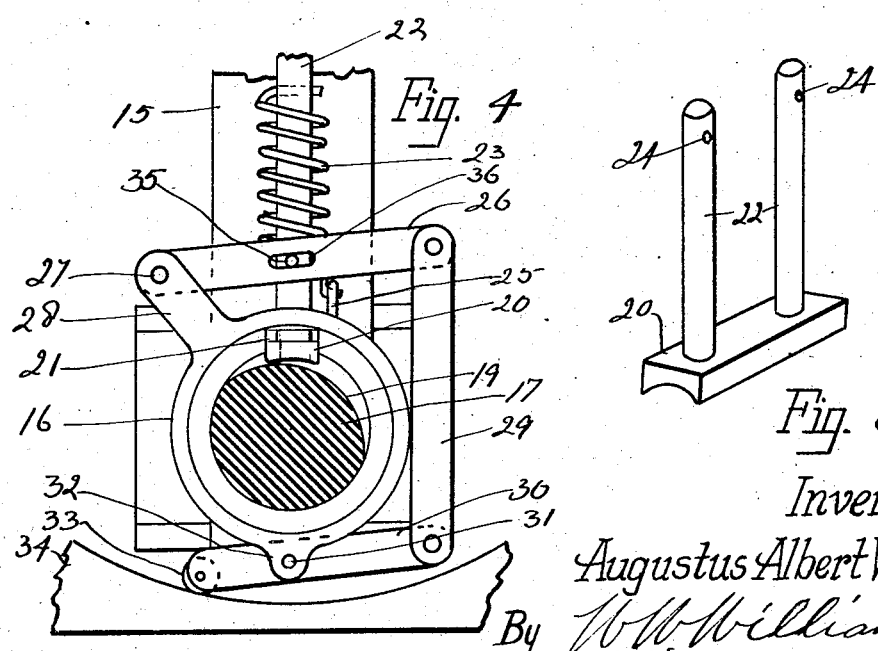
Inventor
*Augustus Albert West*
By
Attorney Sept. 27, 1927.                          1,643,912
A. A. WEST
SUPPLEMENTARY EXHAUST FOR INTERNAL COMBUSTION ENGINES
Filed May 3, 1923            5 Sheets-Sheet 3
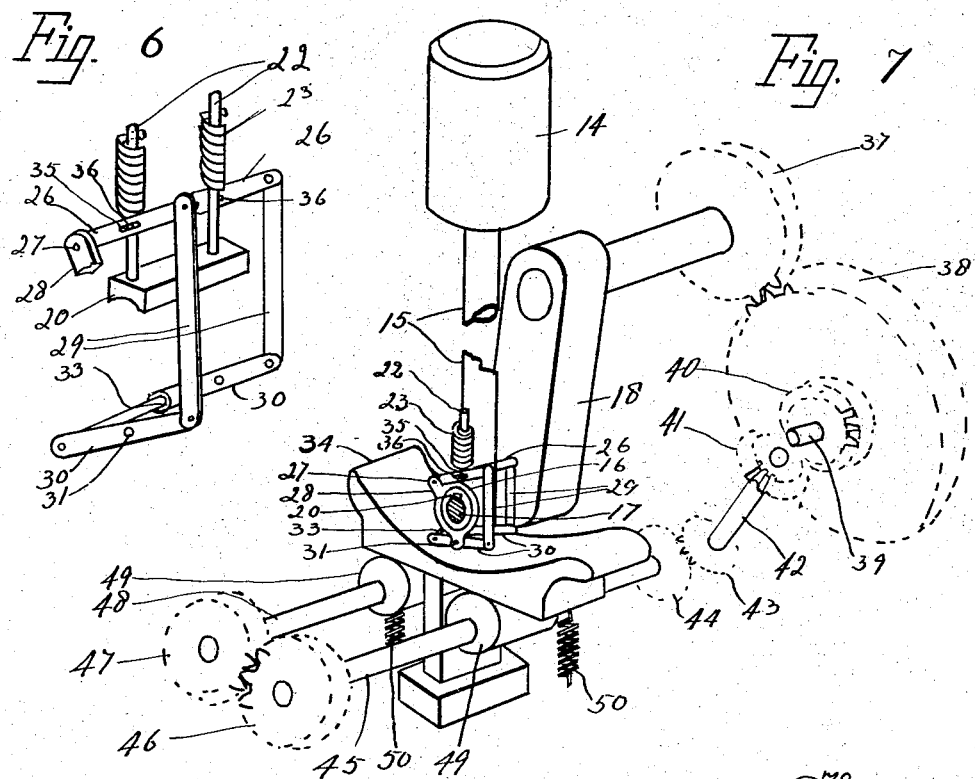
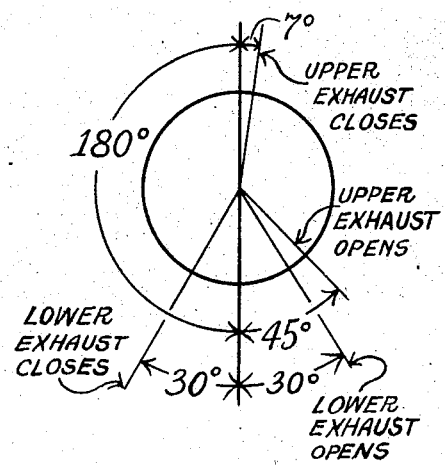
Inventor
*Augustus Albert West*
By W. W. Williamson
Attorney Sept. 27, 1927.
A. A. WEST
1,643,912
SUPPLEMENTARY EXHAUST FOR INTERNAL COMBUSTION ENGINES
Filed May 3, 1923
5 Sheets-Sheet 4
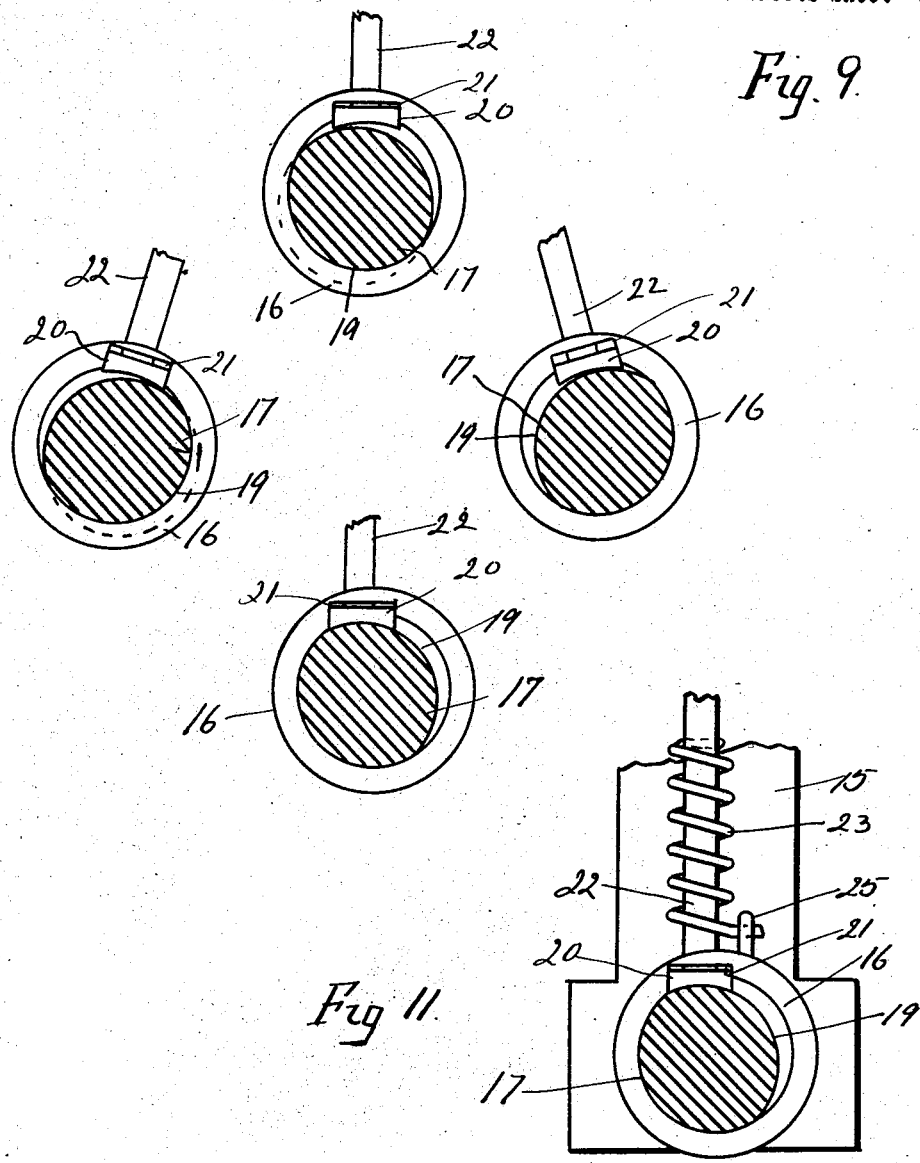
Inventor
Augustus Albert West
By W. W. Williamson
Attorney

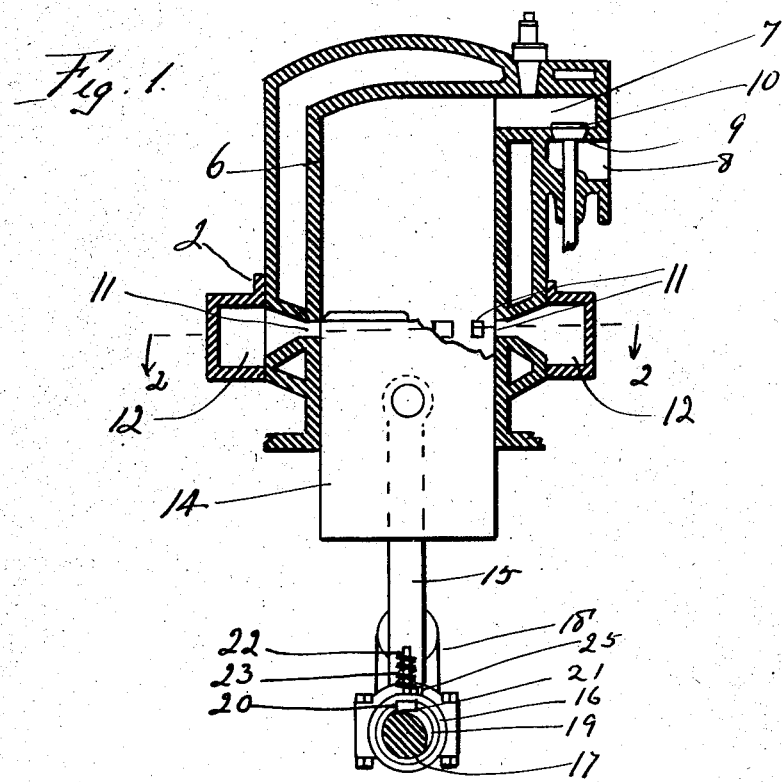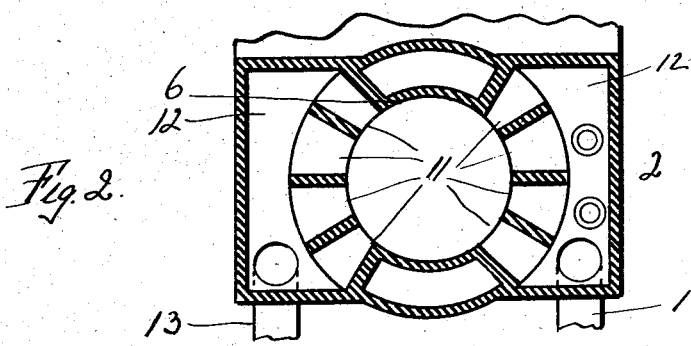

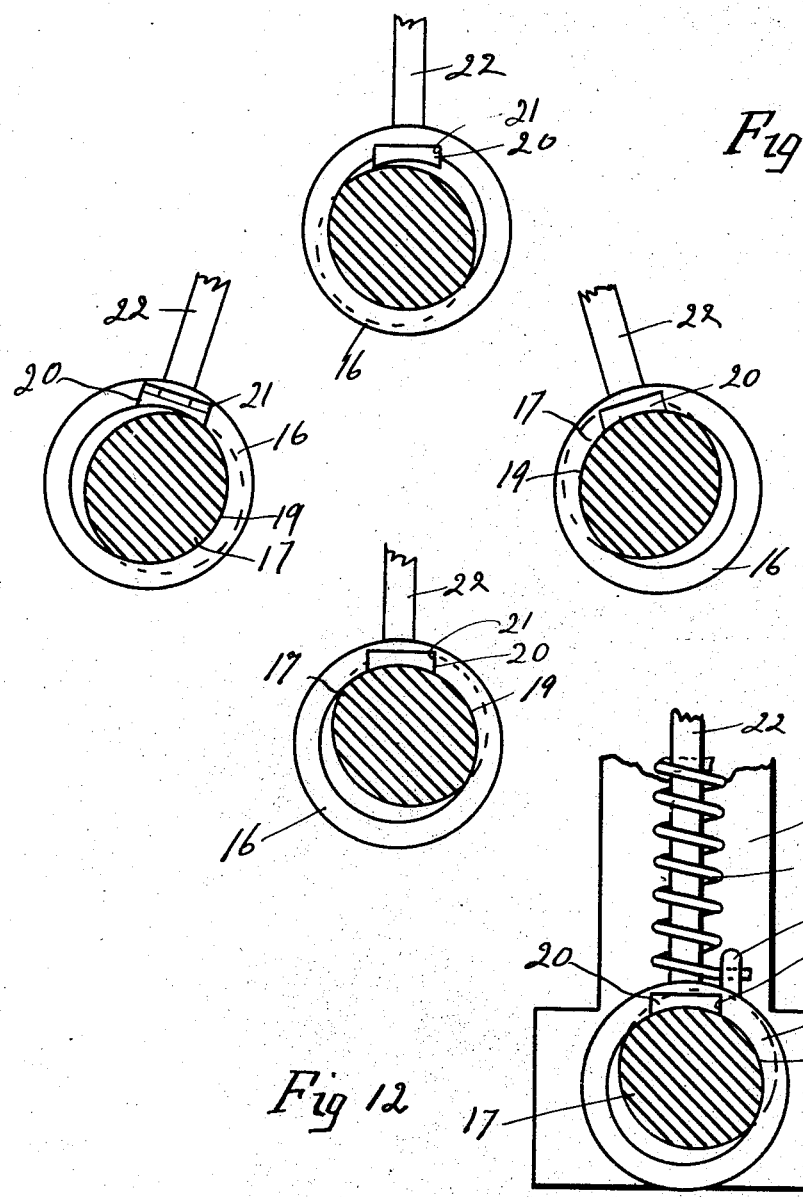

Patented Sept. 27, 1927.

1,643,912

UNITED STATES PATENT OFFICE.

AUGUSTUS ALBERT WEST, OF PHILADELPHIA, PENNSYLVANIA.

SUPPLEMENTARY EXHAUST FOR INTERNAL-COMBUSTION ENGINES.

Application filed May 3, 1923. Serial No. 636,472.

My invention relates to new and useful improvements in a supplementary exhaust for internal combustion engines, and has for its primary object to provide an additional exhaust for burned gases the ports for which are located in the region of the position of a piston when at the bottom of its stroke, in the conventional four-cycle internal combustion engine and this additional exhaust is made use of in connection with the regular exhaust valve located in the region of the piston when at the top of its stroke.

Another object of my invention is to so connect the piston with the crank shaft that said piston will have two different distances of travel in order that the supplementary exhaust ports will be closed by the piston except during the exhaust period.

A further object of this invention is to provide means to cause the piston to travel only the shorter distance except only during the short period.

The advantages of my invention include a more complete scavenge of the cylinder which tends to reduce the heat in the engine which causes a less noisy exhaust, which may eliminate the muffler on this class of engine, thus relieving the back pressure attendant to the use of the muffler, hence improving the power factor from the usual amount of gaseous fuel, resulting in a saving of gasoline or such other fuels as are used. The lessened exhaust noise is highly advantageous in operating aeroplane or motor boat gas engines.

I accomplish the above mentioned objects by providing supplementary exhaust openings or ports in the cylinder below the normal lowest point of travel of the piston head so that on the intake stroke the piston covers these exhaust ports, but the pressure on the piston, due to the explosion, causes the piston to travel a greater distance than when descending on the intake stroke. Thus on the explosion stroke the piston travels below the supplementary exhaust openings or ports allowing a portion of the burned gases to escape from the cylinder through said supplementary exhaust ports. At substantially the same time the usual exhaust valve at the top of the cylinder is opened to permit the burned gases to escape therethrough.

My method of obtaining this dual piston travel is by cutting away an arc on the crank pin of the crank shaft on which pin the connecting rod operates. On the connecting rod bearing is a spring tensioned shoe which normally causes the piston to travel its normal distance on the intake stroke, but the pressure on the piston at the time of the explosion stroke overcomes tension of the spring and thus the piston stroke is lengthened at the lower end of the crank throw.

At very high crank speed there is considerable centrifugal force acting on the connecting rod which might overcome the tension of the spring and cause the piston to travel below the supplementary exhaust openings on the intake stroke which would result in a loss of the gas mixture due to its escape through the supplementary exhaust ports but I prevent this by use of a shoe placed beneath the connecting rod which limits the downward movement of the piston during the intake stroke while permitting said piston to make the longer movement during the explosion or firing stroke.

My invention effects an abundant exhaust as the supplementary exhaust ports are opened at approximately thirty degrees before dead center and closed approximately thirty degrees beyond dead center. During the same time the usual upper exhaust is open and so remains for a period of about two hundred and thirty two degrees to which my supplementary exhaust adds the equivalent of a sixty degrees period in scavenged effect, approximating a total of two hundred and ninety two degrees of exhaust period of a possible three hundred and sixty degrees. Thus my invention gives an additional exhaust benefit of approximately twenty-five per cent over the usual or ordinary exhaust.

A further advantage is the cushioned effect, due to the spring tension, at the top of the piston travel which softens the blow of the explosion. This beneficial cushion effect is analogous to the action in reciprocating steam engines where a small amount of steam is purposely retained in the cylinder at the end of the steam exhaust stroke. In my device this cushion effect tends to lessen jar and "pounding" on the moving parts which should lengthen the life of the engine.

An important feature of design of the cutaway arc on the crank pin is that the full power of the explosion stroke comes against the normal or rounded portion of said crank pin so that no loss of power results from the cutaway arc of the crank pin.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary transverse sectional side elevation of an engine embodying my improvements.

Fig. 2, is a section at the line 2—2 of Fig. 1 of a single cylinder of the engine.

Fig. 3, is a fragmentary longitudinal sectional side elevation of the engine illustrating the different positions of the pistons.

Fig. 4, is an enlarged fragmentary sectional side elevation of the connecting rod and its component parts illustrating the manner in which the downward movement of the piston is regulated.

Fig. 5, is an enlarged perspective view of the spring tensioned shoe.

Fig. 6, is a perspective view of that portion of the mechanism which limits the downward movement of the piston that is carried by the connecting rod.

Fig. 7, is a detail perspective view of a means for actuating the mechanism controlling the movements of the piston during its descent.

Figure 8, is a diagram of the cycle of operations.

Fig. 9, is a semi-diagrammatic view of the different positions of the connecting rod bearing and the spring tension shoe relative to the crank pin during the intake stroke.

Fig. 10, is a similar view of the same parts during an explosion or firing stroke.

Fig. 11, is a fragmentary sectional side elevation of the crank pin and the connecting rod bearing illustrating the position of the parts at the bottom of the intake stroke.

Fig. 12, is a similar view illustrating the position of the same parts at the bottom of the explosion stroke.

In carrying out my invention as here embodied, 2 represents an internal combustion engine of the conventional four-cycle type comprising a plurality of cylinders here illustrated as four in number and designated by the numerals 3, 4, 5 and 6 and each of these has a passageway 7 communicating with the upper portion of the interior which also communicates with an exhaust chamber 8 through the exhaust port 9 controlled by the usual valve 10. In each of the chambers is also located an intake valve, illustrated in dotted lines in Fig. 3, the details of which will not be entered into as it forms no part of my invention.

In the lower part of each cylinder in the region of the lowermost position assumed by the piston is formed the supplementary exhaust herein illustrated as a plurality of exhaust ports 11 suitably spaced about the cylinder and preferably arranged in two diametrically opposite sets, the said ports forming a communication between the lower part of the interior of the cylinder and supplementary exhaust chambers 12 from which lead exhaust pipes 13.

In each cylinder is reciprocatingly mounted a piston 14 of usual or of any well known or desired construction having a skirt of sufficient length to cover the supplementary exhaust ports when at the extreme end of its ascent. With each piston is associated a connecting rod 15 the bearing 16 of which is journalled upon a crank pin 17 of the crank shaft 18. Each crank pin has a cutaway arc 19 forming a depressed bearing surface eccentric to the axis of the crank pin, or in other words, as a varying radius relative to the said crank pin axis.

With each crank pin coacts a spring tensioned shoe 20 which is operable in a recess 21 in a connecting rod bearing and carries a pair of guide rods 22 passing through suitable holes in the bearing and projecting alongside of the component connecting rod parallel therewith each guide rod having a spring 23 coiled thereabout with one end attached to the guide rod by passing the same through a hole 24 while the other end is fixed to a lug 25 on the connecting rod bearing and as these springs are fastened to the above mentioned parts while distended they tend to force the spring tension shoe inward or toward the crank pin thereby normally maintaining that portion of the connecting rod bearing diametrically opposite the spring tensioned shoe in contact with the crank shaft pin during such times as the crank shaft is moving the piston, or in other words, at such times as there is no extraordinary pressure upon the piston.

During the time when an extraordinary pressure is exerted upon the piston, as when an explosion takes place in a cylinder, said piston, its connecting rod and the bearing of the latter are moved relative to the crank pin against the action of the springs 23 thus bringing that portion of the connecting rod bearing in the region of the spring tensioned shoe into contact with the crank pin at the same time forcing the spring tensioned shoe into its recess and moving the surface of the connecting rod bearing which is diametrically opposite the spring tensioned shoe out of contact with the crank pin, as plainly shown in Figs. 10 and 12. This action permits the piston, during the firing stroke, to travel a greater distance in its descent and uncover the supplementary exhaust ports 11, as shown by the position of the piston in the cylinder 5 in Fig. 3, while the shorter distance of travel, as when the piston is descending on the intake stroke, previously referred to, is represented by the position of the piston in cylinder 4 in the same figure.

As shown in Fig. 9 during the intake stroke of a piston the bearing of the connecting rod is constantly held in contact with that surface of the crank shaft pin which is concentric with the axis of said pin and therefore the piston travels the same distance as the crank to which it is connected, as shown in Fig. 1, and also by the piston in cylinder 4 of Fig. 3, but when pressure is exerted upon the piston due to an explosion in the cylinder said piston with its component parts if forced lengthwise relative to the crank shaft and against the action of the springs 23 so that the connecting rod bearing has moved until it is eccentric to the axis of its crank pin during the complete downward stroke as shown in Fig. 10, thereby lengthening the total distance traveled by the piston in its descent which will uncover the auxiliary exhaust ports as shown in relation to the piston in cylinder 5 of Fig. 3. Due to the speed of the engine and the gradual escape of the products of combustion the supplementary exhaust ports will remain uncovered for a period of about sixty degrees, or approximately thirty degrees on each side of the lower dead center, after which the action of the springs 23 will cause the piston and its component parts to assume their normal positions relative to the crank shaft and thus make its full ascending stroke for completely scavenging the cylinder of burned gases through the usual or primary upper exhaust.

The cycles of the two exhausts are diagrammatically illustrated in Fig. 8 wherein it is shown that the upper exhaust opens at approximately forty-five degrees before lower dead center and closes at approximately seven degrees past upper dead center so that said upper exhaust is open approximately two hundred and thirty-two degrees. Shortly after the upper exhaust opens the auxiliary or lower exhaust will be opened and this is approximately thirty degrees before lower dead center and closes approximately thirty degrees after dead center thus remaining open for a period of substantially sixty degrees, thus giving a scavenging period equivalent to approximately two hundred and ninety-two degrees.

As above set forth it is possible, although improbable, that at high speed the connecting rod and its component parts as well as a piston might travel the longer distance due to centrifugal force overcoming the tension of the springs 23 and in order to guard against such a contingency I provide levers 26 pivoted at one end as at 27 to arms 28 carried by the connecting rod bearing, while the opposite ends are pivoted to the upper ends of suitable links 29 the lower ends of which are pivoted to ends of levers 30 the latter being fulcrumed intermediate their ends as at 31 to bosses 32 carried by the connecting rod bearing and between the outer free ends of the levers 30 is journalled a roller 33 which is adapted to ride upon the arcuate surface of the shoe 34. The levers 26 are connected intermediate their ends with the guide rods 22 by means of pins 35 carried by the guide rods and registering with slots 36 in said levers.

With the use of such a mechanism it is necessary to raise and lower the shoe 34 in order to limit the stroke of the piston at one time while permitting it to move the extra distance at another time and in order to accomplish this I have shown a combination of gears and other elements which comprises a small time gear 37 connected with the crank shaft and preferably fixed thereon, said small time gear meshing with a larger time gear 38 mounted on a counter shaft 39, which may be the same as the cam shaft for actuating the primary exhaust and an intake valve. Associated with said larger time gear is a bevel gear 40 meshing with a bevel gear 41 on shaft 42 to which is also fixed another bevel gear 43 meshing with a bevel gear 44 on one end of the shaft 45 while on the opposite end of said shaft is a gear 46 meshing with a gear 47 on the complementary parallel shaft 48 both of said last named shafts underlying the shoe 34. Each of the shafts 45 and 48 carries a cam 49 coacting with the shoe 34 so as to raise the same against the action of gravity as well as springs 50 attached to some suitable portion of the engine for normally moving a shoe out of the path of travel of the connecting rod bearing.

The mechanism above described is so timed that during the descent of the piston and these component parts on the intake stroke the shoe 34 is raised or moved toward the piston so that as the connecting rod bearing reaches the locality of the shoe 34 the roller 33 will ride on the arcuate surface of said cam and thus hold the parts in the positions shown in Fig. 4 which will prevent the piston from traveling a greater distance than when on the firing stroke. When the piston and its component parts are descending on the firing stroke the shoe 34 will be moved out of the path of travel of the roller 33 and thus permit the action of the explosion to move the piston the longer distance and thereby uncover the auxiliary exhaust ports.

From the foregoing it will be seen that I have provided an exceedingly simple and unique method of obtaining a dual piston stroke for opening an auxiliary exhaust at or near the end of a firing stroke while maintaining said auxiliary exhaust in a closed condition at all other times.

Of course I do not wish to be limited to the exact details of construction as herein shown as these may be varied within the limits of the appended claims without departing from the spirit of my invention.

Having thus fully described my invention, what I claim as new and useful is:

1. In combination with an engine including a cylinder provided with the usual exhaust and a supplementary exhaust port, a crank shaft, a piston and connecting rod, means associated with connecting rod and crank shaft for varying the piston travel to uncover the supplementary exhaust port on the firing stroke, and means in the path of travel of the outer end of the connecting rod to limit the piston travel on the suction stroke.

2. In combination with an engine including a cylinder provided with the usual exhaust and a supplementary exhaust port, a crank shaft, a piston and connecting rod, said crank shaft having a cutaway arc on a crank pin, and a spring actuated shoe carried by the connecting rod and coacting with the crank pin to normally hold the bearing of the connecting rod concentric with the axis of the crank shaft pin while permitting said bearing to be moved eccentric to the crank pin due to pressure on the piston for increasing the travel of the piston on the firing stroke and thereby uncover the supplementary exhaust port.

3. In combination with an engine including a cylinder provided with the usual exhaust and a supplementary exhaust port, a crank shaft, a piston and connecting rod, said crank shaft having a cutaway arc on a crank pin, a shoe carried by the connecting rod and coacting with the crank pin, guide rods carried by said shoe, springs acting on said guide rods to normally force the shoe inward, levers pivoted on the connecting rod and having connection with the guide rods intermediate the ends of the levers, other levers fulcrumed on the connecting rod, links joining the first named levers with the last named ones, a roller journalled between the free ends of the second named levers, a shoe adapted to be projected into and out of the path of travel of said roller to limit the movement of the connecting rod and its component parts, cams associated with the shoe and a gear train for actuating said cams and so timed as to move the shoe out of the path of travel of the roller on the firing stroke of the piston.

4. In combination, an engine including a cylinder provided with the usual exhaust and a supplementary exhaust port, a crank shaft, a piston, and a connecting rod mounted on the crank shaft and capable of diametric movement relative to said shaft, whereby pressure on the piston during the firing stroke will move the connecting rod and associated piston a greater distance than on alternate strokes, to uncover the supplementary or exhaust port.

5. In an engine, the combination of a cylinder, a member operating therein, a crank with which said member is movably connected and means to normally maintain the member in fixed relation to the crank while permitting movement thereof relative to the crank due to extraordinary pressure on the member.

6. In an engine, the combination of a cylinder, a crank having a crank pin with a varying diameter, a piston movable in the cylinder, a connecting rod attached to the piston and journalled on the crank pin whereby extraordinary pressure will move the piston and its connecting rod relative to the crank pin.

7. In an engine, the combination of a cylinder having the usual exhaust and a supplementary exhaust port, a crank shaft including a crank pin of varying diameters, a piston in the cylinder, a connecting rod attached to the piston and journalled on the crank pin whereby it may move diametrically of the crank pin, and means to normally take up the lost motion between the connecting rod and crank pin, while permitting said diametrical movement due to extraordinary pressure on the piston to cause the latter to travel beyond the supplementary exhaust port on the firing stroke.

In testimony whereof, I have hereunto affixed my signature.

AUGUSTUS ALBERT WEST.